United States Patent [19]

Cochard

[11] 4,213,114
[45] Jul. 15, 1980

[54] VIBRATION MONITORING SYSTEM FOR AN AIRCRAFT ENGINE

[75] Inventor: Michel Cochard, Villars-sur-Glane, Switzerland

[73] Assignee: Vibro-Meter SA, Fribourg, Switzerland

[21] Appl. No.: 18,420

[22] Filed: Mar. 7, 1979

[51] Int. Cl.² .................................................. G08B 21/00
[52] U.S. Cl. ................................ 340/27 R; 340/683; 340/508; 73/DIG. 1
[58] Field of Search .............. 340/27 R, 52 R, 52 F, 340/508, 529, 582, 648, 665, 683; 73/1 DV, DIG. 1, 496

[56] References Cited

U.S. PATENT DOCUMENTS

| | | | |
|---|---|---|---|
| 3,758,758 | 9/1973 | Games et al. | 340/683 |
| 3,783,680 | 1/1974 | Mason | 340/683 |
| 3,979,739 | 9/1976 | Birchall | 340/683 |

OTHER PUBLICATIONS

B. Hegglin, "History and Experience of the Vibro-Meter Airborne Vibration Monitoring System Installed in the Swissair Coronado Fleet", 13 pages of report.

*Primary Examiner*—Alvin H. Waring
*Attorney, Agent, or Firm*—Wender, Murase & White

[57] ABSTRACT

A monitoring system for detecting and indicating typical operating conditions, particularly vibration of an aircraft engine, wherein at least two measuring feelers such as accelerometers are exposed to the same conditions, the output signals from said feeler are compared with each other and logical means detect normal conditions when the output signals are equal, system defect conditions when the output signals differ from each other and alarm conditions when the output signals both exceed a safety limit. Such a system greatly increases the reliability and at the same time avoids false alarms.

12 Claims, 2 Drawing Figures

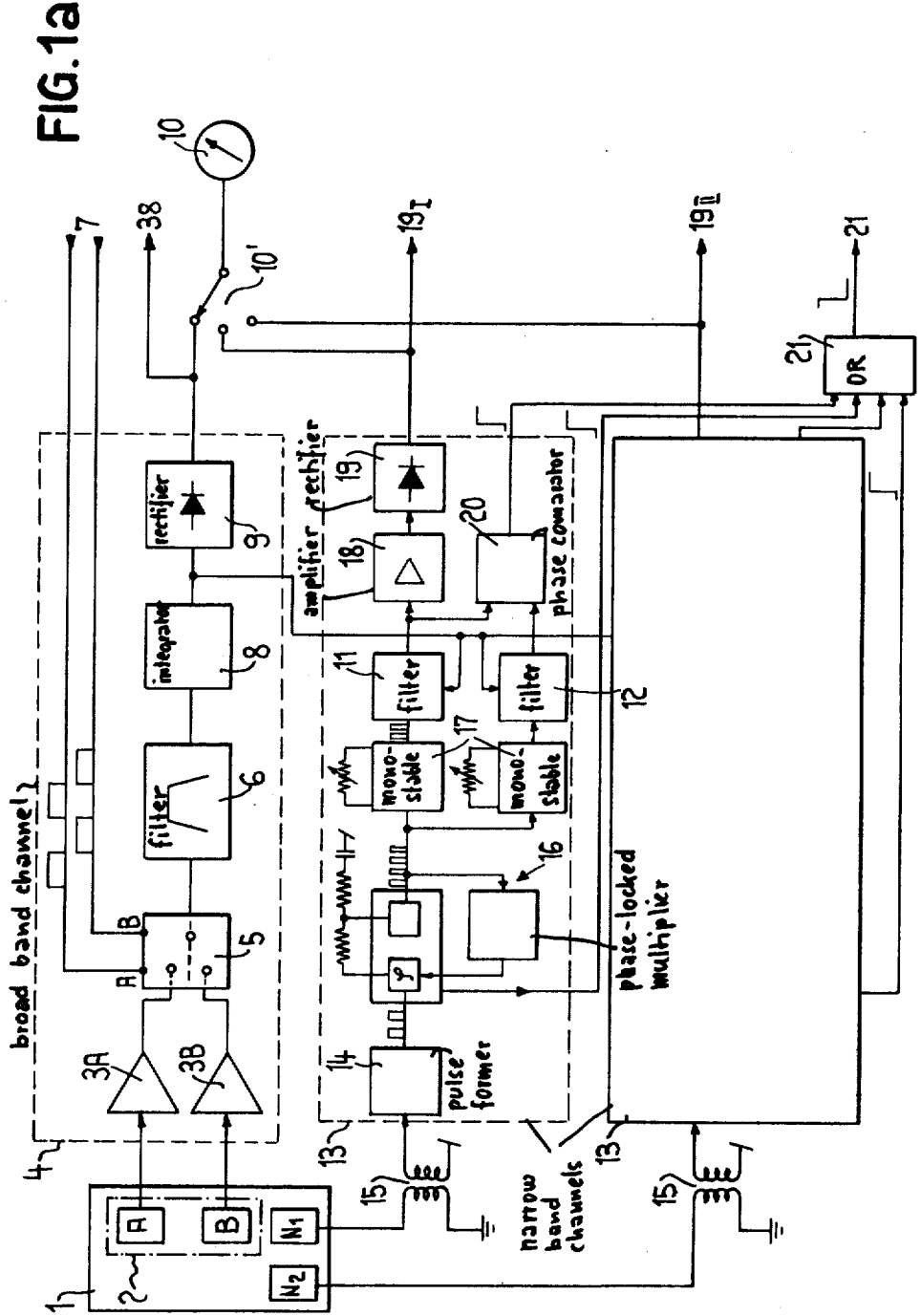

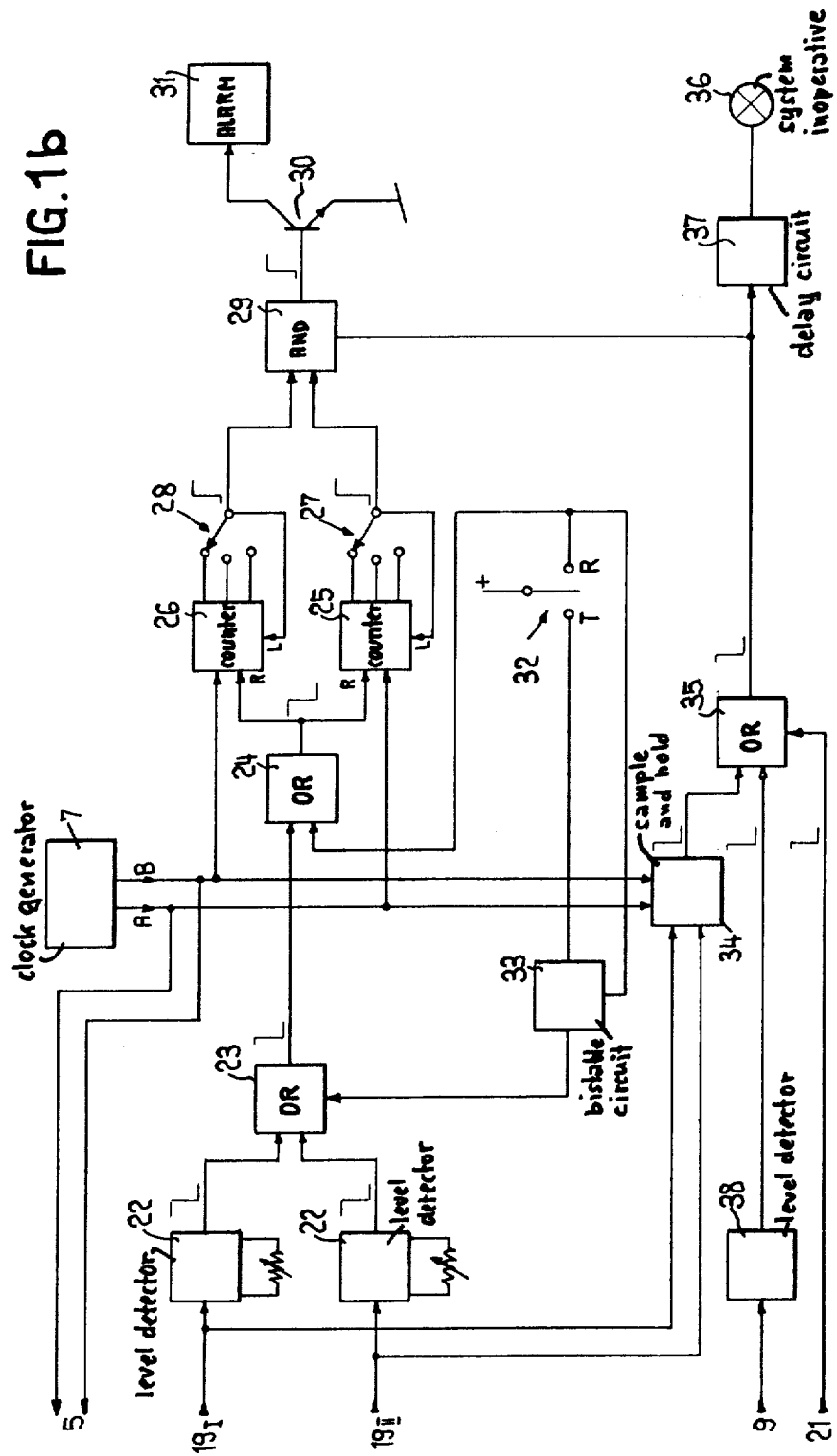

VIBRATION MONITORING SYSTEM FOR AN AIRCRAFT ENGINE

BACKGROUND OF THE INVENTION

Vibration monitoring systems for aircraft engines usually comprise at least one measuring feeler, particularly an accelerometer connected to a measuring and detecting system. Each of the feelers is mounted at a particular place of the engine in order to measure one particularly interesting vibration, and each of the feelers is connected to an individual measuring system the output of which is operating a display unit. This display unit usually comprises a meter continuously indicating the level of vibration and an alarm lamp and/or bell for indicating alarm conditions to the crew. Such a system has a number of drawbacks. Whenever a feeler or a measuring or indicating unit is defectuous a proper monitoring of at least one typical vibration of the engine is no longer obtained. On the other hand if the defect of the feeler and/or measuring system results in an increase of the value indicated an alarm bell or lamp is operated, this forcing the crew to take measures, for instance to shut down the engine. There is no possibility to check the operating condition of the feeler and/or measuring and display system and thereby to distinguish between real alarm conditions in the engine and a defect of the feeler and/or measuring and display unit.

SUMMARY OF THE INVENTION

This invention relates to a monitoring system of the type explained above but of which the reliability and the information available for an operator or the crew is substantially improved. When used as a vibration monitoring system for an aircraft engine, it substantially comprises at least two measuring feelers responsive to vibration, such feelers having similar characteristics and being exposed to the same vibration, means for producing measuring signals corresponding to the output at each of said feelers, comparator means for comparing said measuring signals and logic means interconnected with indicating means for detecting and indicating a normal condition when said measuring signals are substantially equal, a defect condition when said measuring signals differ from each other and an alarm condition when said measuring signals exceed a safety limit. The reliability of the system is substantially increased by the use of at least two measuring feelers mounted on the same support and thus exposed to the same vibration or other quantity to be detected, and the information is appreciably improved by the display of three distinct conditions, namely the normal operating condition, a defect condition indicating that the measuring system is at least partly inoperative and an alarm condition which is only operative when there is a confirmation from both feelers and measuring systems respectively that the value measured exceeds a safety limit.

Preferably the measuring signals from each of the feelers and measuring systems respectively may individually be selected and displayed, this further improving the information available for the crew. If, as an example, the one feeler and measuring channel is defectuous and thus has no output signal at all while the other feeler and measuring channel has an output signal exceeding said safety limit, the crew or operator still is free to take this situation as an alarm condition and to take measures.

The measuring system may itself include internal checking circuits connected with a display unit for indicating a defect condition.

BRIEF DESCRIPTION OF THE DRAWING

FIGS. 1a and 1b show a block diagram of a preferred embodiment of the invention.

DESCRIPTION OF THE PREFERRED EMBODIMENT

FIG. 1a schematically shows an engine 1 of an aircraft. It is assumed that this engine has two coaxial shafts and it comprises two tachometers well known in the art schematically shown at $N_1$ and $N_2$ in the drawing. On a common mounting pad fixed to the engine 1 and schematically shown at 2 in FIG. 1 are fixed two similar vibration feelers, preferably accelerometers A and B connected each to the input of an amplifier 3a and 3b respectively, which are parts of a broad-band channel module 4. This module 4 further includes an electronic switch or selector 5, the inputs of which are connected to the outputs of amplifier 3a and 3b respectively and by which such outputs may alternatively be connected to the input of a broad-band filter 6 as indicated by the solid-state changeover switch in selector 5. Selector 5 is controlled at inputs A and B by signals form a clock generator 7 shown in FIG. 1b, the control signals being schematically shown on the conductors connecting inputs A and B of selector 5 with outputs A and B respectively of generator 7. The output of broad-band filter 6 is connected to the input of an integrator 8 of which the output is rectified in a rectifier 9 and may be applied to a display instrument 10 when a selector switch 10′ is in its normal position as shown in FIG. 1a.

The output of integrator 8 is also connected to the one input of each of two similar narrow-band filters or tracking filters 11 and 12 of a narrow-band channel module 13. Two similar narrow-band channels 13 are provided, each being associated with one of tachometers N1 and N2 respectively. The tachometer signals are transmitted to the input pulse formers 14 through transformers 15. The shaped pulses of which the frequency corresponds to the frequency of the tachometer signals and is directly proportional to the speed of the engine shafts respectively are applied to frequency multipliers 16 of the phase-locked loop type. The multiplied output frequency of each multiplier is applied to the inputs of two similar monostable circuits 17 determining the pulse duration. The pulses at the outputs of circuits 17 are transmitted to the similar tracking filters 11 and 12. These tracking filters are well known in the art and their output signals practically only depend on the amplitude of the basic frequency of the input signal from the integrator 8, that is, on the frequency equal to the 1/revolution speed N1 of the first shaft. All other frequencies which are not related to 1/revolution rotor unbalance N1 like higher harmonic frequencies, noise frequencies and airframe vibrations are practically filtered out and without effect whereby the sensitivity of the measurement is substantially improved. The output signal from filter 11 is applied to an amplifier 18 and a rectifier 19 and from there is transmitted on one hand to the selector switch 10′ and on the other hand to the alarm module shown in FIG. 1b. The output of each tracking filter 11 and 12 respectively is connected to inputs of a phase comparator 20, a signal being produced at the output of this phase comparator 20 whenever the phases of the input signals differ from each other by an appreciable amount.

A narrow-band channel 13 is associated with each shaft and tachometer $N_1$ and $N_2$ respectively, and the output of the phase comparators 20 of each of these channels is applied to an input of an OR circuit 21. Each of the frequency multipliers 16 has a phase comparator in its phase-lock loop indicated by $\psi$ in the drawing. This phase comparators have outputs similar to the output of phase comparators 20, whereby a signal is transmitted to the OR circuit whenever the input signal from pulse former 14 and the signal from the phase-lock loop of the frequency multiplier are no longer in phase, that is, when there is no clear phase relation between such signals.

This is a signal indicating that the frequency multiplier is not properly locked on its input frequency and that, therefore, the whole narrow-band channel is not synchronised at the correct frequency. The same applies when the phase of the output signals from the tracking filters 11 and 12 are not the same, this being only possible when one of such filters does not properly operate. In any such case the OR circuit 21 will produce an output signal at its output which will be transmitted to a system-inoperative indication as described later.

The analogous signals from rectifiers 19 are transmitted to level detectors 22 of the indicator unit shown in FIG. 1b. When the levels of the input signals change from a normal level to a level exceeding a safety level, the output signals from level detectors change and whenever the one of such output signals changes the output signal of an OR circuit 23 also changes. The output from OR circuit 23 is applied to the one input of another OR circuit 24 of which the output is connected to the reset inputs R of counters 25 and 26. The clock or counting input of counter 25 is connected to the clock signal output A of the clock generator 7 while the counting input of counter 26 is connected to clock signal output B. Each of the counters 25 and 26 is followed by a selector switch schematically shown at 27 and 28 respectively, for selecting the counting capacity of the counter which may for instance be selected at 2, 4 or 8. The output of each counter is connected via the selector switch to a latch input L of the counter. The outputs of both counters 26 and 27 and of their output selector switches 27 and 28 respectively are also connected to an AND gate 29 of which the output controls a transistor 30 at the input of an alarm or warning unit 31.

The indicating unit (Fig. 1b) has a control switch 32 which is usually in an off position as shown and may be thrown either to a reset position R wherein resetting pulses are transmitted to the OR circuit 24 and to a bistable circuit 33 or to a test position T for testing the indicating unit. The output of bistable circuit 33 is connected to an input of OR circuit 23.

The indicating unit (FIG. 1b) further comprises a sample and hold circuit 34 in which the levels at the inputs of level detectors 22 are alternatively sampled and memorized under control of the clock signals A and B from the clock generator 7. The output of this sample and hold circuit 34 is connected to an input of an OR circuit 35 of which the output controls a display lamp 36 "SYSTEM INOPERATIVE" through a delay circuit 37 and a blocking input of AND gate 29.

The output signal of rectifier 9 of the broad-band channel 4 is also transmitted to a level detector 38 the output of which transmits a signal to OR circuit 35 when the level at the input of detector 37 is below a predetermined operating limit indicating that no signal is present.

OPERATION

Since transducers A and B are fixed on a common support to which all important vibrations of the engine 1 are transmitted and since such transducers are similar, the same output signals are normally transmitted from both to amplifiers 3A and 3B. Switch 5 is sampling alternatively each one of the signals for a time interval for instance of one second. The sampled signals are transmitted through circuits 6, 8 and 9 and the overall level of the vibrations and noise are indicated at instrument 10 thus giving a first coarse information on the health conditions of the engine.

As already explained the signals from integrator 8 are also transmitted to the tracking filters 11 and 12 of both narrow-band channels 13, and such channels will produce a signal at the output of the tracking filters and of the amplifiers 18 and rectifiers 19 respectively which is indicative of the level or amplitude of the 1/revolution frequency equal to the rotating speed of the first and second shaft respectively. Under normal conditions the level detectors 22 of the indicating unit are inoperative, and consequently counters 25 and 26 are maintained in reset condition through OR circuits 23 and 24. No operating signals are thus transmitted from the AND gate 29 to the transistor 30 and to the alarm unit 31, this unit being thus inoperative. Assuming that the frequency multipliers 16 and the tracking filters 11 and 12 are all properly operating, no signals are transmitted therefrom through OR circuits 21 and 35. The display lamp 36 is inoperative and gate 29 is operative. Since the signals at the inputs of sample and hold circuit 34 are equal the output of this circuit is also inoperative.

If the signals from transducers A and B are not equal, the sample and hold circuit 34 will transmit an output signal to OR circuit 35 and through delay circuit 37 to lamp 36 which indicates that the system is inoperative. At the same time AND gate 29 is blocked in order not to indicate any alarm condition.

If any of circuits 11, 12 or 16 of the narrow-band channels is inoperative, a signal is transmitted therefrom through OR circuits 21 and 35 and the lamp 36 is energized to show that the system is inoperative. Again the alarm system is inhibited by blocking of gate 29.

If the total signal in the broad-band channel 4 as rectified by rectifier 9 is below an operating limit, level detector 38 transmits a signal through OR circuit 35 to lamp 36 whereby the operator or crew is warned that something is wrong but there is not an alarm condition. No alarm is released due to the fact that gate 29 has been inhibited. Meter 10 indicates the total vibration level in the broad-band channel thereby allowing to the operator or crew to judge the urgency and possibly the reason of the trouble. By throwing switch 11 to the two other possible positions, the signal level in narrow-band channels may also be checked.

When an excessively high signal appears in one of the narrow-band channels 13 and thus at the input of one of level detectors 22, an operating signal is transmitted from this level detector 22 through OR circuits 23 and 24 to the reset inputs of counters 25 and 26. These counters are now ready for counting whenever the excess signal from the faulty channel appears but not when the normal signal from the other channel appears. Therefore, one of the counters will start to count until it has arrived at the count set by its selector 27 or 28 respectively. When this count is complete the count is latched by the output signal which is also transmitted to AND gate 29. However, no output signal appears at this gate since one input only is operative, and also since the gate is blocked from the sample and hold circuit which detects a difference between signals in channels A and B. The "SYSTEM INOPERATIVE" light 36 is again energized indicating that in all probability the monitoring system is faulty because both measuring channels should deliver the same information.

If an excessively high signal appears in both narrow-band channels 13 and consequently both level detectors 22 are operative and emit an operating output signal, an operating signal will continuously be applied to the reset inputs of both counters 25 and 26 such that both counters are released for counting clock pulses from generator 7. When the count adjusted by the switches 27 and 28 is reached in both counters, output signals will be applied to both inputs of AND gate 29 and an alarm signal is transmitted to the alarm unit 31 whereby an acoustical and/or visual alarm is energized. The operator now knows that a real alarm condition occurs and that measures should be taken to deal therewith. It is seen that according to the position of selector switches 27 and 28 the alarm condition is transmitted from OR circuit 24 to the alarm unit 31 with a delay of 4, 8 or 16 seconds if it is assumed that the clock frequency is 1 Hz. This delay is very desirable in order to prevent accidental alarms by transitory disturbments in the engine.

The alarm unit may be tested by throwing switch 32 to its test position T in which case a signal is transmitted through bistable circuit 33 and OR circuits 23 and 24 for releasing the counters 25 and 26. Within the adjusted delay of 4, 8 or 16 seconds the alarm will work. In this manner the readiness for service of the alarm circuits may be tested. After this test, the circuits may be reset by throwing switch 32 to the reset position R.

Although the invention has been described above with reference to a monitoring system for an engine having two shafts, a similar system may be provided for an engine having three shafts, in which case three narrow-band channels and level detectors 22 have to be provided.

Usually one complete separate monitoring system is provided for each engine of an aircraft or any other plant such as a power station or the like where similar engines have to be monitored. However, one single monitoring system as shown might also be used for monitoring more than one engine, the system being periodically switched over from one engine or other unit to be monitored to another, for instance for the duration of one minute.

What I claim is:

1. A vibration monitoring system for an aircraft engine, comprising at least two measuring feelers responsive to vibration, such feelers having similar characteristics and being exposed to the same vibration, means for producing measuring signals corresponding to the output at each of said feelers, comparator means for comparing said measuring signals and logic means interconnected with indicating means for detecting and indicating a normal condition when said measuring signals are substantially equal, a defect condition when said measuring signals differ from each other and an alarm condition when both said measuring signals exceed a safety limit.

2. A system according to claim 1, having a single broad-band channel for amplifying signals from said measuring feelers, electronic switch means for alternatively and periodically connecting one of said measuring feelers to said amplifying channel and clock means for control of said switch means.

3. A system according to claims 1 or 2, comprising similar narrow-band channels including tracking filter means, tachometer means each for measuring the speed of one of the shafts of the engine, such tracking filter means being electronically adjustable to a frequency corresponding to the speed of the shaft associated therewith, each narrow-band channel having a pair of two similar tracking filters and the output of each pair of tracking filters being connected to a phase meter adapted to transmit a defect signal if the phase difference at the outputs of the tracking filters exceeds a safety level.

4. A system according to claim 3, wherein each narrow-band channel has a frequency multiplier of the phase-lock loop type including a phase comparator, said comparator having an output at which the signal is indicative of proper phase lock and improper phase lock respectively, the improper phase lock signal indicating faulty operation of the phase-lock multiplier.

5. A system according to claim 4, having means for indicating faulty operation, the outputs of said phase meters and the outputs of said phase comparators being connected to said means for indicating faulty operation through an OR circuit.

6. A system according to claim 4, comprising a low-level detector connected to an output of said broad-band amplifying channel, a control output of said low-level detector being operatively connected to said means for indicating faulty operation.

7. A system according to claim 2, comprising level detectors connected to outputs of measuring channels associated each with one of the shafts of the engine, common control means for two counters, said common control means being controllable through OR means from each of the outputs of said level detectors, counting inputs of said counters connected to outputs of said clock means operating in phase opposition such that counting pulses are applied to said counters alternatively and periodically, each counter being associated with one of the said measuring feelers alternatively and periodically connected to said amplifying channel by said switch means controllable by said clock means, said counters having output means connected to inputs of an AND circuit, the output of said AND circuit being operably connected to an alarm unit operable if both inputs of the AND circuit receive operating signals.

8. A system according to claim 7, comprising an inhibiting circuit for said AND circuit, said inhibiting circuit being operable together with means indicating faulty operation of the measuring circuits including said measuring feelers.

9. A system according to claim 7, comprising a sample and hold circuit for each of the signals appearing at the inputs of said level detectors connected to the outputs of measuring channels associated each with one of the shafts of the engine, said sample and hold circuit being adapted for producing an output signal indicative of a fault of the measuring circuits if such signals appearing at the inputs of the level detectors differ from each other and outside a predetermined tolerance.

10. A system according to claim 1, comprising a test and reset switch allowing transmission of a release signal to said comparator means and thereby releasing an alarm and for resetting said comparator means.

11. A system according to claim 1, comprising a meter for indicating the signal level in at least one signal channel.

12. A system according to claim 3, comprising a selector switch and a meter, the selector switch having inputs connected to said broad-band channel and to each of said narrow-band channels respectively for selectively indicating the signal level in each of said channels.

* * * * *